United States Patent Office 3,181,153
Patented Apr. 27, 1965

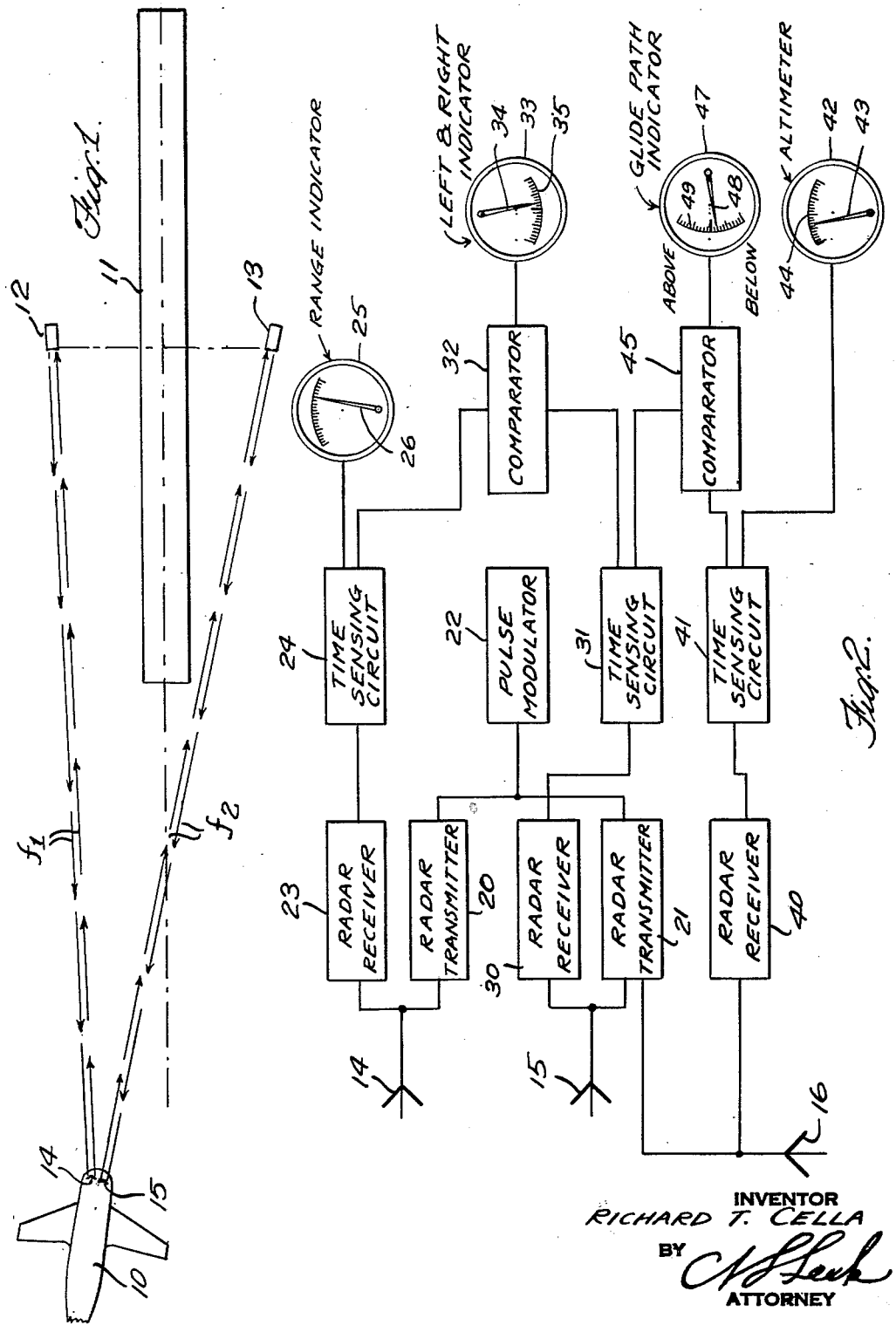

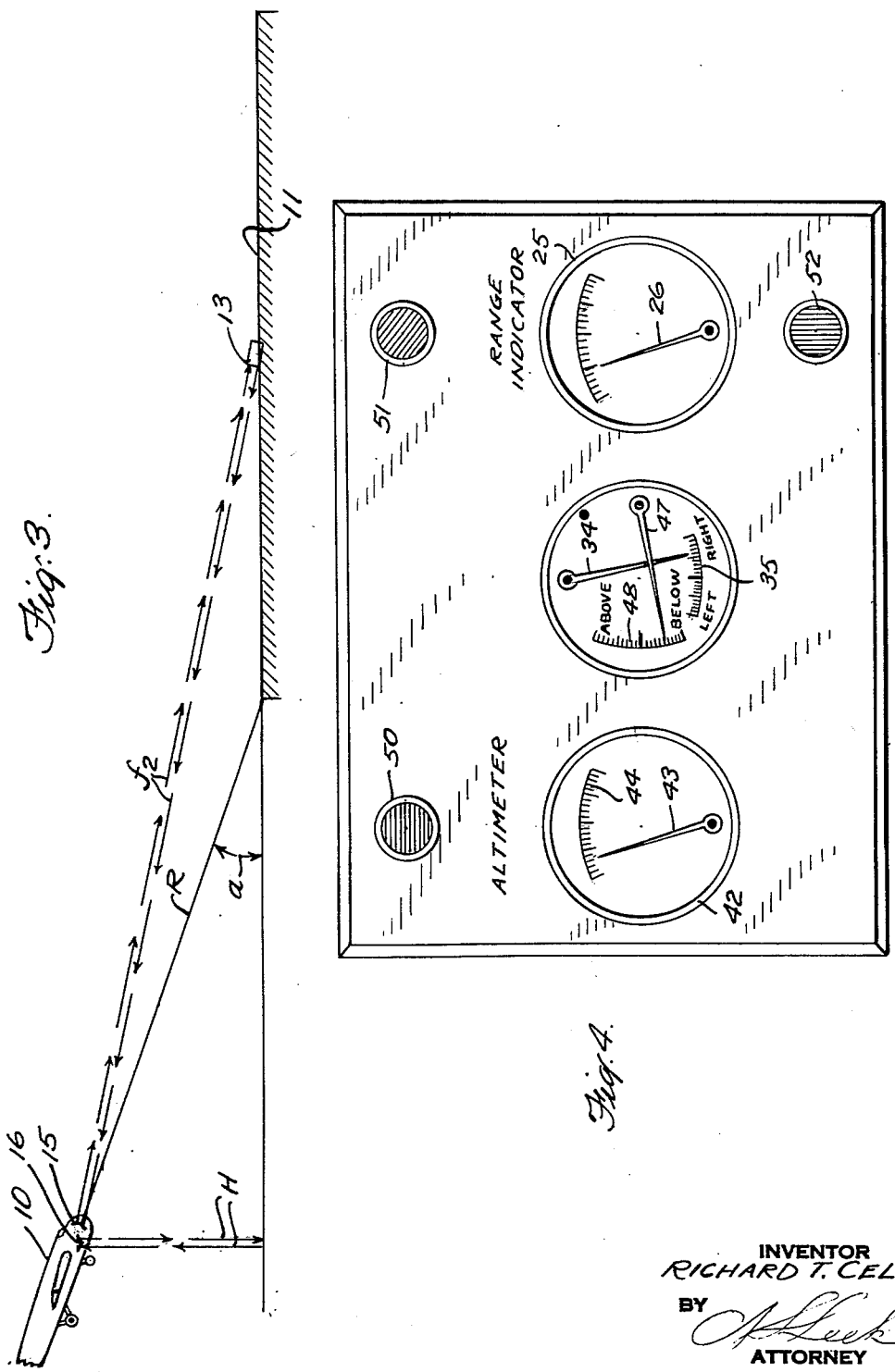

3,181,153
PRECISION INSTRUMENT LANDING SYSTEM
Richard T. Cella, Clarksville Road, R.R. 1,
Trenton, N.J.
Filed Sept. 25, 1959, Ser. No. 842,259
5 Claims. (Cl. 343—12)

This invention relates to a precision instrument landing system for aircraft and has for an object to provide a system which is capable of guiding the pilot to the point of contact with the ground.

Instrument landing systems of the type now in use are capable of guiding the pilot during his approach to the landing field, but are not sufficiently accurate to bring the aircraft in to an actual landing. Some visibility is required for the actual touchdown.

An object of the present invention is to provide a system which becomes effective at the end of the approach and is capable of bringing the craft down to contact with the runway.

A further object is to provide a system of the above type in which the indications can be applied to instruments for manual landing by the pilot or may be used to control automatic pilots for automatic landings without the intervention of a pilot.

Other objects and advantages will be apparent as the nature of the invention is more fully disclosed.

The present system provides an accurate left-right indication which is connected to actuate a left-right pointer for centering the plane with the runway as it approaches and advances to the point of touchdown. A second unit shows the pilot whether he is above or below the approved glide path to the end of the runway. Means is also provided to indicate when the plane has passed over the end of the runway and to indicate accurately the height of the plane above the runway until touchdown. An alarm indicator is also provided to warn the pilot if touchdown has not occurred a sufficient distance before the end of the runway.

This system is based upon the use of radar type time measuring instruments of a type which are capable of making measurements with a high degree of accuracy, for example an accuracy of the order of 1%. With such a system the height of the craft above the ground may be measured to an accuracy of one foot, and the other measurements can be made to a corresponding accuracy. Such instruments are commercially available and the details of the instruments themselves form not part of this invention.

The nature of the invention will be better understood by referring to the following description, taken in connection with the accompanying drawings in which a specific embodiment has been shown for purposes of illustration.

In the drawings:

FIG. 1 is a diagrammatic plan view of a landing strip illustrating the operation of the left-right indicating equipment;

FIG. 2 is a block diagram of the radar equipment for determining the left-right indication and the glide path indication;

FIG. 3 is an elevation of a plane and landing strip illustrating the glide path sensing system; and FIG. 4 illustrates a possible arrangement of the instruments on the instrument panel and the plane.

Referring to the drawings more in detail, FIG. 1 shows a plane 10 coming in for a landing on a runway 11. Midway of the runway and a considerable distance to the right and left thereof are provided a pair of resonant travelling wave reflectors 12 and 13, shown as disposed at the left and right respectively of the runway. The reflectors 12, 13 may be similar to the reflectors 12, 13 at FIG. 1 in U.S. Patent 2,426,218 to Hopgood or they may be re- radiators shown in FIGS. 3, 3a in U.S. Patent 2,426,218 or as beacons A, B at FIG. 1 in U.S. Patent 2,441,956 to DeLoraine et al.

Assuming, for example, that the runway is 6000 feet long, these reflectors would be placed 3000 feet down the runway and some 1000 feet apart. That is, each reflector would be placed 500 feet from the center of the runway. This distance, however, is merely illustrative and will depend upon the accuracy required and upon the local ground conditions.

The plane 10 is provided with a pair of radar type transmitters connected to radiators 14 and 15 located respectively on the left and right sides of the plane and adapted to operate at frequencies $f_1$ and $f_2$ which are sufficiently different to avoid interference. The reflector 12 is tuned to respond to frequency $f_1$ and the reflector 13 is tuned to the frequency $f_2$.

The radar equipment in the plane to be described is designed to measure accurately the difference in time of the reflected signals from the respective reflectors 12 and 13 and to produce an indication of such difference on a right-left deviation indicator. Obviously, when the plane is centered with respect to the runway 11 the distance to both reflectors would be the same. Any deviation from this condition indicates that the plane has drifted either to the right or to the left of the central axis of the runway. Such an indication is made available to the pilot so that he can maintain his correct alignment during descent.

FIG. 3 indicates the operation of the glide path sensing system. The transmitters and receivers may be any conventional units, for example, as disclosed in U.S. Patent 2,055,883 to Terry including the time sensing meter M.

As shown in this figure the range to the reflector 13 is derived from the radar equipment connected to the radiator 15 and the height of the plane is determined by a radar transmitter connected to a vertically disposed radiator 16. The actual range R to the forward end of the runway would be determined by subtracting 3000 feet from the indicated range to the reflector 13. The ratio of the height H to the range R represents the sine of the angle $a$ which constitutes the angle of the predetermined glide path. Any variation from this glide path is determined by sensing the difference in the ratio of $H/R$ from the predetermined ratio which represents the sine of the angle $a$. This difference is applied to a suitable indicator on the instrument panel. At the same time the range R and the height H are made available on suitable instruments on the instrument panel of the plane.

Referring to the block diagram of FIG. 2, a radar type transmitter 20 is shown connected to the radiator 14 and a similar radar type transmitter 21 is shown as connected to the radiators 15 and 16. These transmitters 20 and 21 may be pulsed by a common pulse modulator 22 or may be individually actuated. The transmitter 20 is designed to operate on the frequency $f_1$ and the transmitter 21 is designed to operate on the frequency $f_2$ as above set forth.

The radiator 14 is connected to a radar type pulse receiver 23 which is adapted to receive the echo pulse reflected from the reflector 12. The receiver 23 is connected to a time sensing circuit 24 which is adapted to produce a response proportional to the time interval between the transmitted and received pulses in a manner which is well known in the radar art. Such an indication may be determined, for example by the phase difference between oscillations in the receiver and transmitter and may be used to generate a voltage which is proportional to this time interval. The output of the time sensing circuit 24 is shown as connected to a range indicating instrument 25 having a pointer 26. The indicator 25 is corrected to indicate the range R to the forward end of the landing strip 11.

The radiator 15 is connected to a radar receiver 30 similar to the receiver 23, the output of which is connected to a time sensing circuit 31 which is adapted to produce a signal representing the distance to the reflector 13. The time sensing circuits 24 and 31 are connected to a comparator circuit 32 which is adapted to compare the signals from the two time sensing circuits and to produce an output voltage which is proportional to the difference between such signals. This output voltage is applied to a left-right indicator 33 having a pointer 34 which is normally centered on a scale 35, but is shifted to the right or left in response to any difference in distance between the respective reflectors 12 and 13 as determined by the comparator circuit 32. For example, when the plane has veered to the left from the axial center of the runway as indicated in FIG. 1, the pointer 34 will be deflected to the right to indicate that the pilot must fly to the right to correct his position. This is in accordance with the usual practice in instrument landing systems where the pointer deflection is such that the pilot always flies "toward the needle." The vertical radiator 16 is connected to a receiver 40 which in turn is connected to a time sensing circuit 41 of the type above mentioned which is adapted to produce an indication representing the height of the plane above the ground. This sensing circuit 41 is connected to an altimeter 42 having a pointer 43 moving over a scale 44 to indicate height above the ground. The time sensing circuits 31 and 41 are connected to a comparator circuit 45 which is adapted to compare the time responses of the circuits 31 and 41 and to sense any deviation from the predetermined ratio above mentioned and to produce an output voltage proportional to such deviation. The output of the comparator 45 is applied to a glide path indicating instrument 47 having a pointer 48 which is centered on a scale 49 when the position indicated by the comparator circuit 45 corresponds to the predetermined glide path. When the indicated position is above the correct glide path, the pointer 48 will be deflected downwardly and vice versa. Of course the pointers 34 and 48 may be incorporated in the same instrument as indicated in FIG. 4 for convenience. The comparators 32 and 45 may be any conventional suitable devices corresponding to the type of transmitters and receivers used. For example, when the transmitters and receivers are as disclosed in U.S. Patent 2,055,883 the comparators may be the circuit for obtaining the ratio of two voltages with indicating meter 91 as disclosed in U.S. Patent 2,763,838 to McConnell. Terminals 36, 37 could be connected to one side of the meter M disclosed in Patent 2,055,883. A direct current differential amplifier, as shown in U.S. Patent 2,543,818 to Williams, could also be used between my time sensing circuits 24, 31, 41 and the meters. With some slight modifications obvious to those skilled in the art the amplitude comparator in U.S. Patent 3,020,397 to Pierce et al. or the D.C. comparator circuit 80 in U.S. Patent 2,905,887 to Taddeo could be used as comparators with my invention.

FIG. 4 shows a possible arrangement of instruments on the instrument panel wherein the pointers 34 and 47 are incorporated in the same central instrument to indicate left-right deviation and glide path deviation. The range indicating instrument 25 is shown as located beside the central instrument and the altimeter 42 is shown at the left of the central instrument.

The panel is also provided with a blue signal light 50, a green signal light 51 and a red signal light 52.

In operation the plane is assumed to have been guided to within 3000 feet of the runway by presently known systems of the so-called instrument landing system type.

The present system is designed to become effective when the plane has reached the end of its instrument approach and is 3000 feet from the end of the runway and in general alignment therewith.

The radar equipment above described is normally designed to become effective and to produce indications on the various instruments only when the range R is 3000 feet or less. At this point the green light 51 is energized to indicate to the pilot that he is within the range of operation of the present system.

The pilot then continues his approach by observing the crossed pointers 34 and 47 and so operating the plane as to maintain both pointers in their center positions.

When the plane reaches the end of the runway, the range pointer 26 will indicate 0, and at this point the green light 51 is extinguished and the blue light 50 is energized.

Also the passage of the plane over the end of the runway will be indicated to the pilot by the usual marker beacon. At this point the pilot will observe the altimeter pointer 43 which indicates the actual height above the runway and this pointer, in combination with the left-right pointer 34, will give the pilot sufficient information for him to bring the plane down to contact with the runway.

When the plane has traversed 3000 feet of the runway, the blue light 50 will be extinguished and the red light 52 will be actuated. If contact has not been made by this time, the red light will constitute a warning to the pilot that he does not have sufficient runway left for a safe landing.

The actuation of the blue and red lights may be controlled by timed mechanism to take place a predetermined time after the range pointer indicates 0 or after the marker beacon indicates passage over the end of the runway.

The left and right radar transmitters have been indicated as operating on frequencies $f_1$ and $f_2$ respectively for separation purposes. In some instances, however it may be possible to use a single radar transmitter and to separate echo waves received from the left and right reflectors respectively by providing coded reflectors so that the echo waves are distinguishable.

If a more accurate range determination is required, the time intervals to the left and right reflectors may be averaged by connecting the time sensing circuits 24 and 31 to an averaging circuit which is connected to the range indicating instrument.

Also the range R may be determined by a separate radar transmitter if desired cooperating with a reflector at the leading end of the runway and operating on a frequency different from the frequencies of the left and right radar transmitters. In this way the actual range to the leading edge of the runway may be determined without compensating for the distance of the reflectors 12 and 13 from the end of the runway and for the angular difference in slant ranges to the two points. However, since the angle A is of the order of 1½ degrees for a normal approach, this difference in the slant ranges would in effect be negligible.

The output of the comparators have been shown as applied to indicating instruments for mounting on an instrument panel. These outputs, however, may be connected to actuate an automatic pilot of known type for effecting an automatic control of the landing of the aircraft.

What is claimed is:

1. A precision instrument landing system for guiding an aircraft to actual touchdown on a runway, comprising a pair of radar reflectors located a known distance from the leading end of the runway and at fixed distances to the left and right respectively of the central axis of the runway, at least two radar transmitting and receiving means on said aircraft adapted to transmit radar pulses and to receive echo pulses reflected from said left and right reflectors respectively, and time sensing means to derive therefrom signals representing the range to the respective reflectors, comparing means connected to receive said signals and to produce an output signal representing the difference between said range signals, and a member responsive to said output signal having a response proportional to the difference between said first signals and representing the deviation of the path of the plane from the correct approach path.

2. The precision instrument landing system according to claim 1 wherein one of said left and right reflectors is tuned to respond to radar pulses of frequency $f_1$ and the other of said left and right reflectors is tuned to respond to radar pulses of frequency $f_2$ and said radar transmitting means on said aircraft comprises (a) a first radar transmitting means adapted to transmit radar pulses of frequency $f_1$ to said reflector tuned to respond to said frequency $f_1$ and (b) a second separate radar transmitting means adapted to transmit radar pulses of frequency $f_2$ to said reflector tuned to respond to said frequency $f_2$, said frequencies $f_1$ and $f_2$ being sufficiently different to be non-interfering.

3. A precision instrument landing system for guiding an aircraft to actual touchdown on a runway, comprising a pair of radar reflectors located a known distance from the leading end of the runway and at fixed distances to the left and right respectively of the central axis of the runway, at least two radar transmitting means on the aircraft adapted to transmit radar pulses to said reflectors and vertically to the ground beneath said craft, radar receiving means on the aircraft having means receiving the echo pulses from said reflectors and from the ground and to derive therefrom time functions corresponding to the respective ranges, means comparing the time functions derived from the left and right reflectors to determine the different therebetween and means comparing the time function to one of said reflectors with the time function to ground to derive therefrom the difference in the ratio therebetween from a given ratio, and means actuated by said differences to indicate respectively left and right deviations and vertical deviations of the craft from a predetermined glide path.

4. The precision instrument landing system according to claim 3 wherein one of said left and right reflectors is tuned to respond to radar pulses of frequency $f_1$ and the other of said left and right reflectors is tuned to respond to radar pulses of frequency $f_2$ and said radar transmitting means on said aircraft comprises (a) a first radar transmitting means adapted to transmit radar pulses of frequency $f_1$ to said reflector tuned to respond to said frequency $f_1$ and (b) a second separate radar transmitting means adapted to transmit radar pulses of frequency $f_2$ to said reflector tuned to respond to said frequency $f_2$, said frequencies $f_1$ and $f_2$ being sufficiently different to be non-interfering.

5. A precision instrument landing system for guiding an aircraft to actual touchdown on a runway, comprising a pair of radar reflectors located a known distance from the leading end of the runway and at fixed distances to the left and right respectively of the central axis of the runway, one of said left and right reflectors being tuned to respond to radar pulses of frequency $f_1$, and the other of said left and right reflectors being tuned to respond to radar pulses of frequency $f_2$, radar pulse transmitting means on said aircraft adapted to transmit radar pulses of frequency $f_1$, to said reflector tuned to respond to said frequency $f_1$, radar pulse transmitting means on said aircraft separate from said first radar pulse transmitting means adapted to transmit radar pulses of frequency $f_2$ to said reflector tuned to respond to said frequency $f_2$ and to the ground beneath the aircraft, said frequencies $f_1$ and $f_2$ being sufficiently different to be noninterfering, a first radar receiving channel on said aircraft connected to receive echo pulses from the left reflector and to derive a time function therefrom, a second radar receiving channel connected to receive echo pulses from said right reflector and a derive a second time function therefrom, a comparing circuit connected to compare said time function and to produce an output signal representing the difference therebetween, a third radar receiving channel adapted to receive echo pulses from the ground beneath the aircraft and to derive a third time function therefrom, a comparing circuit connected to compare said third time function with one of said first and second time functions and to produce an output signal representing the deviation in ratio between the last compared functions and a predetermined ratio representing the sine of the desired glide path angle, and left-right and vertical indicators activated by said output signals to indicate the lateral and vertical deviations respectively of the aircraft from a predetermined glide path.

References Cited by the Examiner
UNITED STATES PATENTS

| | | | |
|---|---|---|---|
| 2,055,883 | 9/36 | Terry | 343—13 |
| 2,405,239 | 8/46 | Seeley | 343—15 |
| 2,426,218 | 8/47 | Hopgood | 343—108 |
| 2,441,956 | 5/48 | Deloraine et al. | 343—11 |
| 2,502,974 | 4/50 | McElhannon | 343—18 |
| 2,604,621 | 7/52 | Earp et al. | 343—108 |
| 2,699,545 | 1/55 | Havens | 343—13 |

CHESTER L. JUSTUS, *Primary Examiner.*